United States Patent
Khajeh et al.

(10) Patent No.: US 9,389,330 B2
(45) Date of Patent: Jul. 12, 2016

(54) FORMATION MEASUREMENTS USING FLEXURAL MODES OF GUIDED WAVES

(71) Applicants: Ehsan Khajeh, Spring, TX (US); Yang Liu, Spring, TX (US)

(72) Inventors: Ehsan Khajeh, Spring, TX (US); Yang Liu, Spring, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 288 days.

(21) Appl. No.: 14/230,786

(22) Filed: Mar. 31, 2014

(65) Prior Publication Data

US 2015/0276960 A1   Oct. 1, 2015

(51) Int. Cl.
  *G01V 1/50*  (2006.01)
  *G01V 1/44*  (2006.01)

(52) U.S. Cl.
  CPC .......... *G01V 1/44* (2013.01); *G01V 2210/6242* (2013.01)

(58) Field of Classification Search
  CPC .......... G01V 1/44; G01V 2210/6242
  USPC .......................................... 367/35
  See application file for complete search history.

(56) References Cited

U.S. PATENT DOCUMENTS

| | | | | |
|---|---|---|---|---|
| 4,805,156 A | * | 2/1989 | Attali | .................. E21B 47/0005 181/105 |
| 7,773,454 B2 | * | 8/2010 | Barolak | .............. E21B 47/0005 181/105 |
| 2007/0097788 A1 | | 5/2007 | Tang et al. | |
| 2010/0265794 A1 | | 10/2010 | Johnson et al. | |
| 2011/0080803 A1 | | 4/2011 | Vu et al. | |
| 2014/0177389 A1 | * | 6/2014 | Bolshakov | .......... E21B 47/0005 367/35 |

FOREIGN PATENT DOCUMENTS

| | | | | |
|---|---|---|---|---|
| EP | 0296987 A2 | 12/1988 | | |
| EP | 0296987 B1 | * 7/1992 | ............... | G01V 1/50 |
| EP | 0990174 A1 | 4/2000 | | |
| EP | 0990174 B1 | * 11/2004 | ............... | G01V 1/48 |

OTHER PUBLICATIONS

Haldorsen, et al., "Borehole Acoustic Waves", Oilfield Review, Spring 2005, pp. 34-43.

(Continued)

*Primary Examiner* — Daniel L Murphy
(74) *Attorney, Agent, or Firm* — Cantor Colburn LLP

(57) ABSTRACT

An embodiment of a method of estimating a property of an earth formation includes: disposing an acoustic tool in a borehole in an earth formation, the acoustic tool including an acoustic source and an acoustic receiver, the borehole having an axial direction; transmitting an acoustic signal into the borehole by the acoustic source, the acoustic signal having a selected frequency and transmitted at a propagation angle relative to the axial direction, the propagation angle selected to excite a desired guided flexural wave mode that propagates along a surface of the borehole; detecting an received acoustic signal by the acoustic receiver; calculating, by a processor, an incident angle of the received acoustic signal, the incident angle relative to the axial direction; measuring a shift of the propagation angle based on the incident angle; and estimating a property of the formation based on the shift of the propagation angle.

20 Claims, 3 Drawing Sheets

(56) References Cited

OTHER PUBLICATIONS

Liu et al., "Higher order interaction of elastic waves in weakly nonlinear hollow circular cylinders. II. Physical interpretation and numerical results", part 2, Journal of Applied Physics 115, 214902 (2014), 10 pages.
Liu, et al. "A Single-Element Transducer with Nonuniform Thickness for High-Frequency Broadband Applications", IEEE Transactions on Ultrasonics, Ferroelectrics, and Frequency Control, vol. 56, No. 2, Feb. 2009, pp. 379-386.
Liu, et al., "Cumulative second harmonics in weakly nonlinear plates and shells", Health Monitoring of Structural and Biological Systems 2013, edited by Tribikram Kundu, Proc. of SPIE. vol. 8695, 86950S • © 2013 SPIE; 12 pages.
Liu, et al., "Higher order interaction of elastic waves in weakly nonlinear hollow circular cylinders. I. Analytical foundation", Journal of Applied Physics 115, 214901 (2014), 11 pages.
Liu, et al., "Interaction of torsional and longitudinal guided waves in weakly nonlinear circular cylinders", 2013 Acoustical Society of America, J. Acoust. Soc. Am. 133 (5), May 2013, pp. 2541-2553.
Liu, et al., "Nonlinear Ultrasonic Guided Waves for Microstructure Characterization of Hollow Cylinders", 13th International Symposium on Nondestructive Characterization of Materials (NDCM-XIII), May 20-24, 2013, Le Mans, France, 8 pages.
Liu, et al., "On selection of primary modes for generation of strong internally resonant second harmonics in plate", Journal of Sound and Vibration, 332, (2013), pp. 4517-4528.
Liu, et al., "Second Harmonic Generation of Guided Waves in Circular Cylinders: Analysis of Axisymmetric Torsional and Longitudinal Modes", ASNT. Memphis, USA (2013), pp. 71-82.
Liu, et al., "Strongly Cumulative Second Harmonic Generation in a Plate With Quadratic Nonlinearity: Finite Element Simulation", 39th Annual Review of Progress in Quantitative Nondestricuve Evaluation, 2013, pp. 151-158.
Liu, et al., "Third harmonic shear horizontal and Rayleigh Lamb waves in weakly nonlinear plates", Journal of Applied Physics, vol. 114, (2013), 10 pages.
Mijarez, et al., "Experiments and modelling of guided wave propagation in a mulitple-wire cable", 18th World Conference on Nondestructive Testing, Apr. 16-20, 2012, Durban, South Africa, 9 pages.
Notification of Transmittal of the International Search Report and the Written Opinion of the International Searching Authority, or the Declaration; PCT/US2015/022426; mail date Jun. 26, 2015; 16 pages.
Rose, Joseph L., "Ultrasonic Guided Waves in Solid Media", Cambridge University Press, 2014, 36 pages.

* cited by examiner

FORMATION MEASUREMENTS USING FLEXURAL MODES OF GUIDED WAVES

BACKGROUND

Formation evaluation is critical for effective management of oil and gas reservoirs. Different physical methods are used for formation evaluation such as acoustics, electromagnetics, nuclear and others. Some evaluation methods are performed downhole during a drilling operation (LWD) or in an existing borehole, e.g., using wireline logging tools. Acoustic logging is one of the major methods used for formation evaluation, and is used to estimate mechanical properties of formations.

SUMMARY

An embodiment of a method of estimating a property of an earth formation includes: disposing an acoustic tool in a borehole in an earth formation, the acoustic tool including an acoustic source and an acoustic receiver, the borehole having an axial direction defined by a longitudinal axis of the borehole; transmitting an acoustic signal into the borehole by the acoustic source, the acoustic signal having a selected frequency and transmitted at a propagation angle relative to the axial direction, the propagation angle selected to excite a desired guided flexural wave mode that propagates along a surface of the borehole; detecting an received acoustic signal by the acoustic receiver; calculating, by a processor, an incident angle of the received acoustic signal, the incident angle relative to the axial direction; measuring a shift of the propagation angle based on the incident angle; and estimating a property of the formation based on the shift of the propagation angle.

An embodiment of a system for estimating a property of an earth formation includes an acoustic tool configured to be disposed in a borehole in an earth formation, the borehole having an axial direction defined by a longitudinal axis of the borehole. The acoustic tool includes an acoustic source and an acoustic receiver, the acoustic source configured to transmit an acoustic signal into the borehole at a propagation angle relative to the axial direction, the propagation angle selected to excite a desired guided flexural wave mode that propagates along a surface of the borehole. The system also includes a processor configured to calculate an incident angle of a received acoustic signal detected by the receiver, the incident angle relative to the axial direction, measure a shift of the propagation angle based on the incident angle, and estimate a property of the formation based on the shift of the propagation angle.

BRIEF DESCRIPTION OF THE DRAWINGS

The following descriptions should not be considered limiting in any way. With reference to the accompanying drawings, like elements are numbered alike.

DETAILED DESCRIPTION

There are provided devices, systems and methods for estimating earth formation characteristics including mechanical properties of earth formations. An embodiment of a method includes exciting guided flexural waves in a borehole by an acoustic source at a selected angle of propagation relative to a borehole axis, detecting the flexural waves at a sensor located in the borehole at a selected axial distance from the source, and calculating a shift in the angle of propagation. This shift is used to estimate the anisotropy of the formation. The shift may also be used to estimate wave velocity in both a plane parallel to the direction of the borehole axis and perpendicular to the borehole axis.

In one embodiment, the angle of propagation is derived by detecting linear acoustic surface waves excited by transmitting axisymmetric guided acoustic wave signals in the borehole. The surface waves are used to determine the frequency and propagation angle at which the acoustic source is actuated in order to excite the flexural (e.g., helical) waves. In this way, a combination of flexural and axisymmetric guided waves can be utilized to measure formation anisotropy and wave velocity.

The anisotropy and/or wave velocity can be analyzed to estimate properties of the formation. Such properties include petrophysical and mechanical properties such as lithology, porosity, permeability and saturation.

Figure 1:
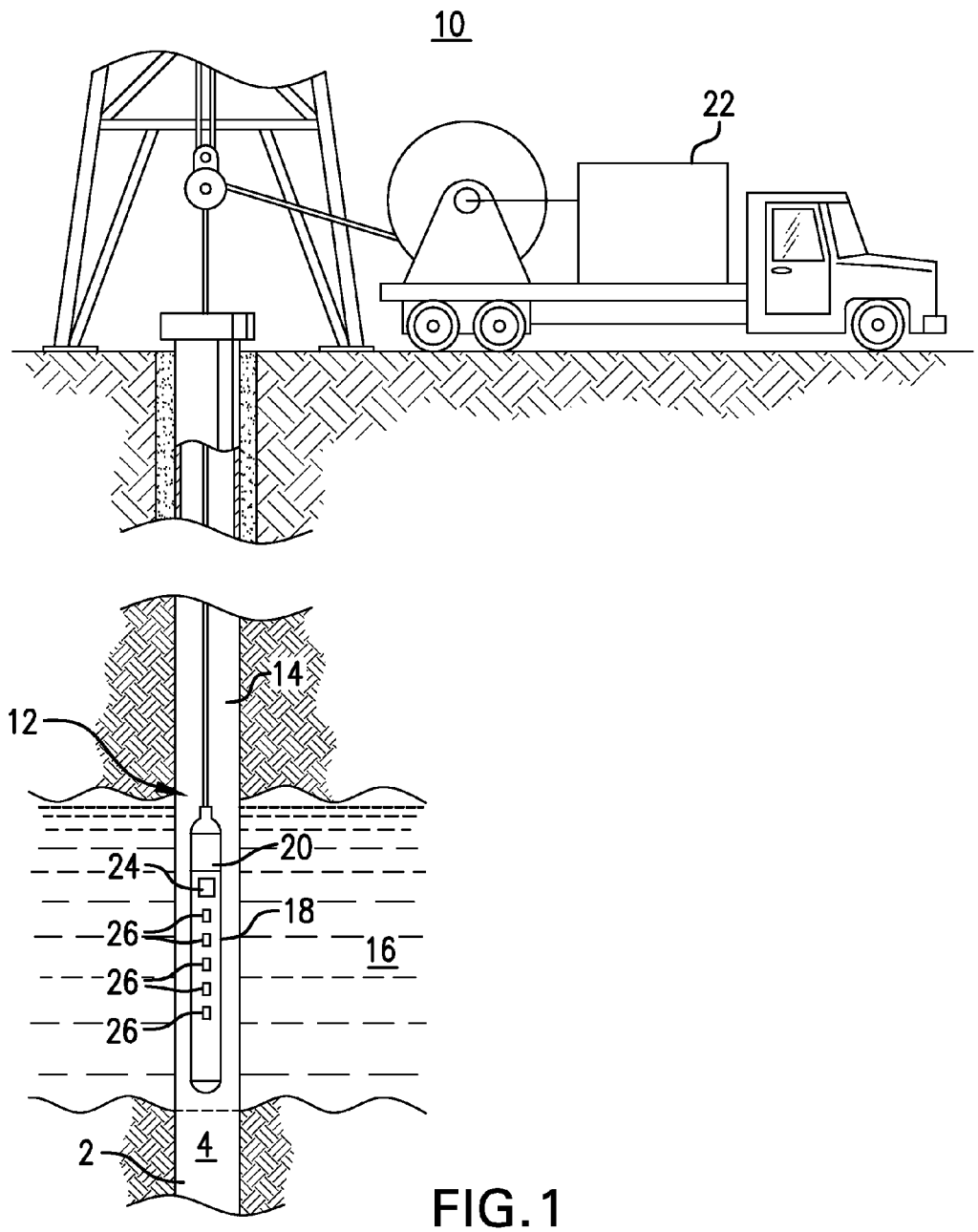
FIG. 1 depicts an embodiment of a system for evaluating or measuring a formation.

FIG. 1 illustrates aspects of an exemplary embodiment of a system 10 for performing energy industry operations such as formation measurement and/or evaluation, hydrocarbon production, completion and stimulation. The system 10 includes a borehole string 12 such as a wireline, pipe string, coiled tubing or other carrier disposed within a borehole 14 in an earth formation 16, which is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In one embodiment, the system 10 includes a measurement and data acquisition tool 18 configured to be disposed in the borehole 14 and advanced to an area or location of interest within the formation 16. The tool 18 is configured to perform measurements of the borehole and/or formation. Such measurements include acoustic measurements of the formation that entail emitting acoustic (e.g., sound and/or vibration) signals into the formation 16 to estimate characteristics thereof. It is noted that although the embodiments described herein are described in conjunction with vertical wells, they are not so limited, as they could be used with deviated, horizontal and any other boreholes having any selected path through a formation.

In one embodiment, the tool 18 and/or other downhole components are in communication with one or more processing units or devices, such as a downhole electronics unit 20 and/or a surface processing unit 22. The processing devices are configured to perform various functions including receiving, storing, transmitting and/or processing data from the tool 18. The processing devices include any number of suitable components, such as processors, memory, communication devices and power sources. Communication can be achieved via any suitable configuration, such as electrical or optical communication (e.g., via a communication cable), wireless communication and mud pulse telemetry.

In one embodiment, the tool 18 and/or the system 10 is configured for acoustic measurement and/or monitoring of the formation 16, in which acoustic waves or vibrations are transmitted into the borehole 14 and the formation 16. For example, the tool 18 includes one or more acoustic sources or transmitters 24 that emit acoustic energy pulses. One or more acoustic receivers 26, such as an axial array of receivers 26, are positioned along the tool 18.

In one embodiment, the tool 18 is configured to generate acoustic waves (also referred to as acoustic signals) that excite axisymmetric guided waves and/or flexural guided waves for estimation of formation properties. In one embodiment, the tool 18 is configured to generate acoustic signals that excite flexural waves in the borehole by a suitable acoustic transducer or other source, such as a linear phased array transducer. The flexural waves can be detected and measured to estimate formation properties related to anisotropy and seismic velocity. The use of flexural waves as described herein allows for the calculation of the velocity of acoustic waves in a plane perpendicular to the axial direction of the well. It is noted that, although embodiments and methods are described in conjunction with the system 10, they are not so limited. The embodiments and methods described herein may be used with any device or system capable of generating acoustic guided waves.

In one embodiment, the tool 18 is configured (alone or in combination with other tools or components) to excite both axisymmetric guided waves (e.g., longitudinal and/or torsional) and flexural waves, so that a combination of flexural and axisymmetric guided waves is utilized to measure formation anisotropy. For example, the tool 18 includes a transducer array that can be actuated to excite an acoustic signal to generate an axisymmetric guided wave, such as a Stoneley wave, that propagates along the borehole axis, and also excite an acoustic signal configured to generate flexural waves, which propagate along the borehole in a direction that includes axial and circumferential components.

Figure 2:
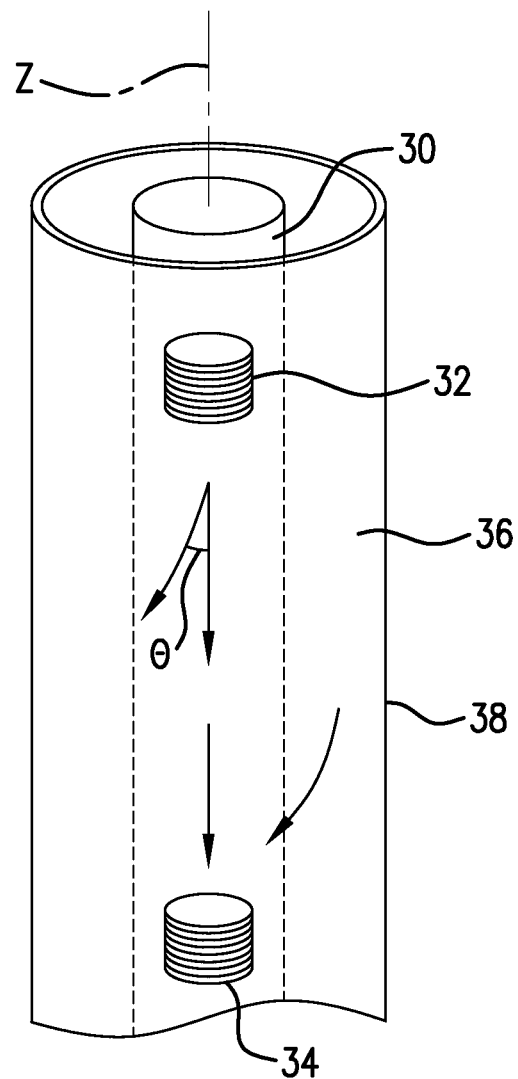
FIG. 2 depicts portions of an exemplary acoustic tool and propagation paths of axisymmetric and flexural modes along a borehole.

FIG. 2 illustrates an exemplary borehole including a portion of an acoustic tool, and demonstrates the propagation behavior of axisymmetric and flexural waves. An acoustic tool 30 includes an acoustic source 32, e.g., a piezoelectric ring transducer, and a receiver 34. The tool 30 is disposed in a borehole 36 having a surface 38 or wall that forms an interface between the borehole (e.g., borehole fluid) and the surrounding formation. The geometry of the borehole results in numerous potential surface wave modes (e.g., longitudinal, torsional, flexural, etc.). Axisymmetric waves 40 can be generated that propagate along the borehole axis, also referred to as the z axis, from the source 32 to the receiver 34. Various flexural modes can be excited, which travel along the surface of the borehole at an angle relative to the z-axis, referred to herein as the propagation angle θ. The propagation angle can also be considered to be equal to the pitch angle (relative to the z-axis) of a helix formed by the path of the flexural mode propagation along the borehole. The propagation direction of each flexural mode depends on the radius of the borehole, frequency of excitation, and the phase velocity of the corresponding axisymmetric mode.

The travel time and the distance between a source or transmitter and a receiver can be used to estimate the wave velocity of an axisymmetric wave. Attenuation of acoustic guided waves is also used to determine the petrophysical properties of the formation. In addition, if the formation is anisotropic, the flexural mode can be used to provide information about the mechanical properties of the formation in a plane perpendicular to the axial direction, as well as in the axial direction.

Flexural guided waves are similar to axisymmetric guided waves, but propagate at an angle with respect to the axial direction, and therefore their wave-vector has axial and circumferential components. For example, the flexural guided waves can propagate along a helical path on the surface of the borehole (or other borehole interface). Analysis of the circumferential wave-vector component for flexural modes opens a new perspective that can be used for the measurement of the wave velocity in a plane perpendicular to the axial direction of borehole. Using the embodiments described herein, both axial and circumferential wave velocity in an anisotropic formation can be studied.

Figure 3:
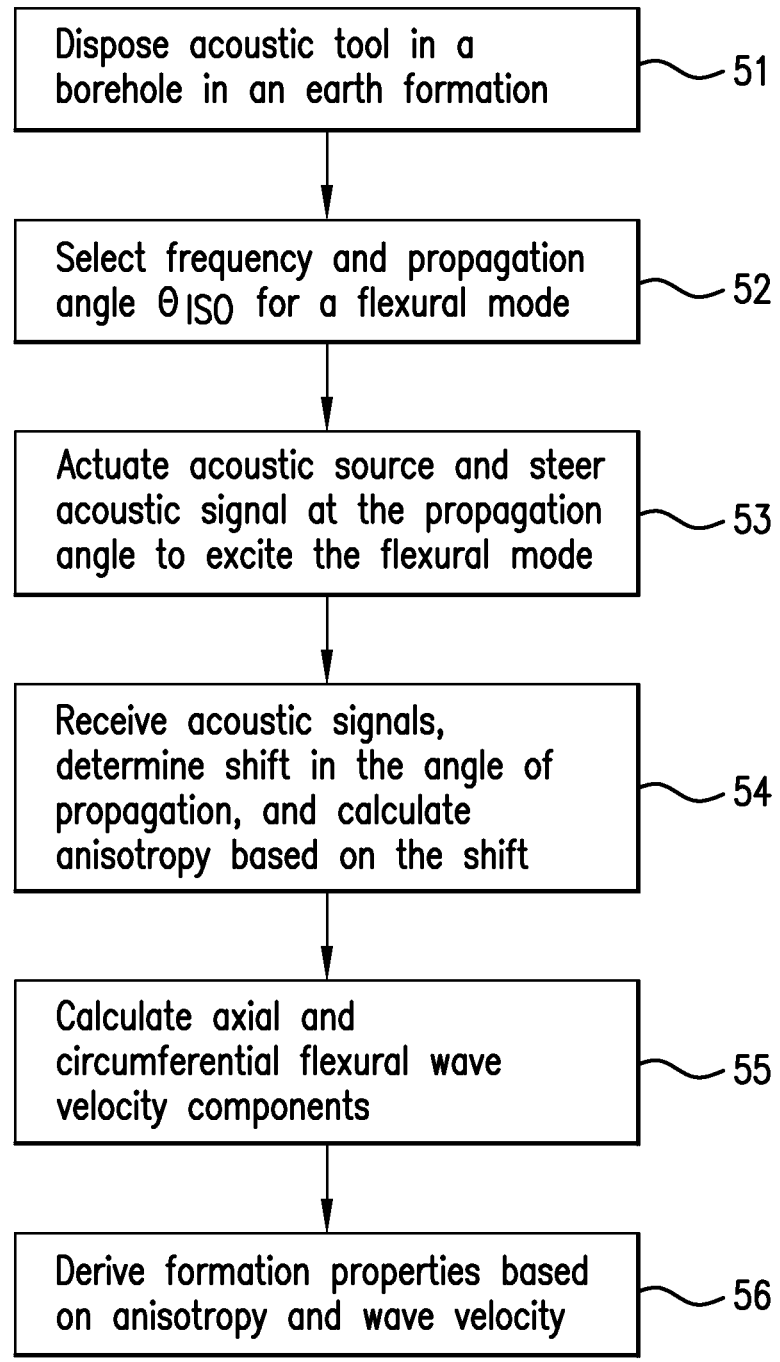
FIG. 3 is a flow chart illustrating an embodiment of a method of estimating properties of a formation

FIG. 3 illustrates a method 50 for estimating characteristics or properties of a formation. The method 50 includes one or more stages 51-56. The method 50 is described herein in conjunction with a processor (e.g., the processing unit 22) that receives signal data, but is not so limited, and can be performed in conjunction with any number of processing devices. In one embodiment, the stages 51-56 are performed in the order described, although some steps may be performed in a different order or one or more steps may be omitted.

In the first stage 51, a carrier including an acoustic measurement device or tool is disposed in a borehole in an earth formation. For example, a tool such as the wireline tool 18 includes at least one linear phased array transducer device or other acoustic source.

Various types of acoustic sources and transducers may be used to excite desired guided wave modes. Examples of such sources include surface acoustic wave (SAW) devices such as interdigitated transducer (IDT), comb and angled beam sources. The transducers can be configured to excite acoustic waves in the formation fluid or at the borehole wall.

The transducer device, in one embodiment, includes a ring transducer having one or more transducer rings that can be actuated to generate axisymmetric guided waves in the borehole. In one embodiment, the transducer device is configured to generate directional acoustic signals that excite guided flexural waves that propagate along a selected direction, e.g., a direction along the borehole wall having a selected propagation angle. An exemplary transducer device includes a ring of transducers circumferentially arranged. The transducers, in one embodiment, are configured as a phased array, in which each transducer in the ring (or a group of transducers), is electrically coupled to a signal source to allow for time delay between excitation to steer the acoustic signal.

The tool also includes one or more acoustic receivers, e.g., the receivers 26. The acoustic receiver may include one or more transducer rings similar to those used for the acoustic source.

In the second stage 52, the frequency and propagation angle for a desired flexural mode is selected. The frequency, flexural mode and propagation angle are selected based on the borehole geometry and formation properties, such as mechanical properties including elastic moduli and Poisson's ratio. Dispersion characteristics of various frequencies and associated flexural modes are used to select an angle of propagation at which the acoustic signal should be directed for a selected frequency. For example, the frequency is selected for the borehole geometry that is known would have one or more flexural modes that could be generated.

In one embodiment, an axisymmetric guided wave is generated and measured to derive mechanical properties. For example, the acoustic source is actuated to excite axisymmetric guided wave pulses at a selected frequency or frequencies, which propagate along the borehole and are detected by one or more receivers. The frequency of excitation is chosen such that several flexural modes are available at that frequency. The time of flight between the transmitter and receiver is measured. Considering the known distance between the transmitter and receiver, the group velocity of the guided axisymmetric wave is measured. Matching this velocity with axisymmetric dispersion curves for the borehole, mechanical properties of the formation such as Young's modulus (E) and (ν) Poisson ratio in axial direction are derived.

The angle of propagation is selected based on the derived mechanical properties. Mechanical properties of the formation, such as those derived using axisymmetrical waves as discussed above, are used to derive dispersion curves for different modes that can be generated in the borehole. Based on these dispersion curves, an angle of propagation $\theta_{Iso}$ is derived for one or more desirable flexural modes. This angle of propagation is selected based on an assumption that the formation is isotropic.

In the third stage 53, an acoustic beam is generated at the selected propagation angle $\theta_{Iso}$ relative to the borehole axis to excite the desirable flexural mode. In one embodiment, an acoustic transmitter including a linear time delay phased array is used to steer the beam at the selected propagation angle $\theta_{Iso}$ in order to excite the desirable flexural mode.

The flexural mode propagates along the borehole and is detected by one or more receivers. For example, the excited flexural mode is received at a ring of transducers at a specific distance from the transmitter phase array.

In the fourth stage 54, a shift in the angle of propagation due to formation anisotropy is determined. This shift may be used to calculate the change in wave velocity of the flexural mode, including the change in the circumferential wave velocity.

In one embodiment, a flexural mode for a selected frequency is excited at the selected propagation angle $\theta_{Iso}$, travels along the borehole, and is detected by the receiver. In this embodiment, the transmitter is a linear phased array transducer or other device capable of transmitting an acoustic signal at multiple angles.

If the formation material surrounding the borehole is anisotropic, the angle of propagation for the flexural mode is shifted from the selected angle to an angle $\theta_{AnIso}$, which is the angle of propagation relative to the borehole axis of the flexural waves that are incident to the receiver. Because of the formation anisotropy, excitation at the angle $\theta_{Iso}$ does not produce a pure flexural mode.

The wave form or shape detected by the receiver is compared to the known wave form associated with the flexural mode, e.g., from displacement curves. If the detected signal is not the pure flexural mode, the transmitter steers the acoustic signal to one or more additional angles, e.g., sweeps the signal using time delay on the phased array transducer. The detected wave form for each additional angle is analyzed, and when the pure flexural mode wave form is observed at the receiver, the angle at which the acoustic signal was generated is recorded as the shifted angle $\theta_{AnIso}$. The group velocity shift of the flexural mode and the anisotropy can be calculated based on the shift in the angle.

In one embodiment, after excitation of a flexural mode at $\theta_{Iso}$, the generated flexural mode is received using a circumferential array or ring of transducers. Based on the phase shift in the signal at different transducers in the ring, the angle $\theta_{AnIso}$ of the incident wave is determined. As discussed above, the shift in the propagation angle (also referred to as the angle shift) can be used to determine the anisotropy of the formation.

In the fifth stage 55, the wave velocity is calculated based on the angle shift and the time of flight of the flexural mode. In one embodiment, the shifted angle at which the flexural mode propagates, which is determined in stage 54, is used to calculate the circumferential velocity of the flexural waves.

For example, to determine the axial component of the wave velocity, the axial distance between the source and the receiver is divided by the recorded time of flight from the source to the receiver. Referring to the embodiment of FIG. 2, the axial component of the velocity in the z-direction, $c_z^{flex}$, is calculated based on the axial distance between the source 32 and the receiver 34 and the time of flight.

To determine the circumferential component of the wave velocity, the length of the propagation path is calculated based on the shifted angle $\theta_{AnIso}$. For example, the path length is calculated by measuring the length of a helix or spiral starting from the source and ending at the receiver, and having a pitch angle equal to $\theta_{AnIso}$. The path length is divided by the time of flight to calculate the total velocity $c^{flex}$. The circumferential velocity $c_\theta^{flex}$ can be calculated using the following:

$$c_{74}^{flex} = \sqrt{c^{flex^2} - c_z^{flex^2}}.$$

In the fourth stage 54, formation properties are calculated or derived based on the analyzed acoustic signals. For example, mechanical properties of the formation such as lithology, permeability and fracture characteristics are derived based on anisotropy estimations derived based on the propagation angle shift. Mechanical properties can also be derived using wave velocity calculations.

By knowing the axial and circumferential velocity components, mechanical properties of the formation can be estimated based on the wave velocity both along the axial direction of the borehole and in a radial direction. For example, the axial component of the velocity $c_z^{flex}$ can be used to estimate mechanical properties along a direction parallel to the z-axis, and the circumferential component $c_\theta^{flex}$ can be used to estimate mechanical properties of the formation along a direction perpendicular to the z-axis.

The embodiments described herein present numerous advantages, including the ability to use acoustic guided waves to measure formation anisotropy and mechanical properties of a formation in directions other than a borehole axial direction. Prior art methods using axisymmetrical guided waves are not capable of effectively measuring the mechanical properties of an anisotropic formation in a plane perpendicular to the axial direction. The embodiments described herein address such disadvantages.

Generally, some of the teachings herein are reduced to an algorithm that is stored on machine-readable media. The algorithm is implemented by a computer or processor such as the processing unit 22 and/or electronics unit 20 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a property of an earth formation, comprising:
    disposing an acoustic tool in a borehole in an earth formation, the acoustic tool including an acoustic source and an acoustic receiver, the borehole having an axial direction defined by a longitudinal axis of the borehole;
    transmitting an acoustic signal into the borehole by the acoustic source, the acoustic signal having a selected frequency and transmitted at a propagation angle relative to the axial direction, the propagation angle selected to excite a desired guided flexural wave mode that propagates along a surface of the borehole;
    detecting an received acoustic signal by the acoustic receiver;
    calculating, by a processor, an incident angle of the received acoustic signal, the incident angle relative to the axial direction;
    measuring a shift of the propagation angle based on the incident angle; and
    estimating a property of the formation based on the shift of the propagation angle.

2. The method of claim 1, wherein the propagation angle is selected based on an assumption that the formation is isotropic.

3. The method of claim 1, wherein estimating the property includes estimating formation anisotropy based on the shift.

4. The method of claim 1, wherein the propagation angle is selected based on a dispersion curve derived from information regarding mechanical properties of the formation.

5. The method of claim 4, wherein the mechanical properties are estimated by transmitting an axisymmetric guided wave from the acoustic source to the receiver, calculating a time of flight of the axisymmetric guided wave, calculating a wave velocity of the axisymmetric guided wave, and estimating the mechanical properties based on the wave velocity.

6. The method of claim 1, wherein calculating the incident angle includes:
    comparing the received acoustic signal to a wave shape corresponding to the flexural wave mode;
    based on the acoustic signal not corresponding to the wave shape, steering the acoustic source to generate an additional acoustic signal at an additional angle;
    detecting a received additional acoustic signal at the receiver;
    comparing the received additional acoustic signal to the wave shape, and selecting the additional angle as the incident angle based on the received additional acoustic signal corresponding to the wave shape.

7. The method of claim 1, wherein the receiver includes a circumferential array of transducers, and calculating the incident angle includes measuring a phase shift between the received acoustic signal measured at different transducers in the array.

8. The method of claim 1, further comprising estimating a velocity of the received acoustic signal based on the incident angle.

9. The method of claim 8, wherein estimating the velocity includes measuring a time of flight between the source and the receiver, calculating a length of a helical path traveled by the flexural mode based on the incident angle, and calculating a circumferential component of the velocity based on the time of flight and the length.

10. The method of claim 9, wherein estimating the property includes estimating mechanical properties of the formation in a plane perpendicular to the axial direction based on the velocity.

11. A system for estimating a property of an earth formation, comprising:
    an acoustic tool configured to be disposed in a borehole in an earth formation, the acoustic tool including an acoustic source and an acoustic receiver, the borehole having an axial direction defined by a longitudinal axis of the borehole, the acoustic source configured to transmit an acoustic signal into the borehole at a propagation angle relative to the axial direction, the propagation angle selected to excite a desired guided flexural wave mode that propagates along a surface of the borehole;
    a processor configured to calculate an incident angle of a received acoustic signal detected by the receiver, the incident angle relative to the axial direction, measure a shift of the propagation angle based on the incident angle, and estimate a property of the formation based on the shift of the propagation angle.

12. The system of claim 11, wherein the propagation angle is selected based on an assumption that the formation is isotropic.

13. The system of claim 11, wherein the processor is configured to estimate formation anisotropy based on the shift.

14. The system of claim 11, wherein the propagation angle is selected based on a dispersion curve derived from information regarding mechanical properties of the formation.

15. The system of claim 14, wherein the mechanical properties are estimated by transmitting an axisymmetric guided wave from the acoustic source to the receiver, calculating a time of flight of the axisymmetric guided wave, calculating a wave velocity of the axisymmetric guided wave, and estimating the mechanical properties based on the wave velocity.

16. The system of claim 11, wherein incident angle is calculated by:
    comparing the received acoustic signal to a wave shape corresponding to the flexural wave mode;
    based on the acoustic signal not corresponding to the wave shape, steering the acoustic source to generate an additional acoustic signal at an additional angle;
    detecting a received additional acoustic signal at the receiver;
    comparing the received additional acoustic signal to the wave shape, and selecting the additional angle as the incident angle based on the received additional acoustic signal corresponding to the wave shape.

17. The system of claim 11, wherein the receiver includes a circumferential array of transducers, and the processor is configured to calculate the incident angle by measuring a phase shift between the received acoustic signal measured at different transducers in the array.

18. The system of claim 11, wherein the processor is configured to estimate a velocity of the received acoustic signal based on the incident angle.

19. The system of claim 18, wherein the processor is configured to estimate the velocity by a method that includes measuring a time of flight between the source and the receiver, calculating a length of a helical path traveled by the flexural mode based on the incident angle, and calculating a circumferential component of the velocity based on the time of flight and the length.

20. The system of claim 19, wherein the processor is configured to estimate mechanical properties of the formation in a plane perpendicular to the axial direction based on the velocity.

\* \* \* \* \*